(No Model.)
S. L. HARWOOD.
MECHANICAL MOVEMENT.
No. 594,741. Patented Nov. 30, 1897.
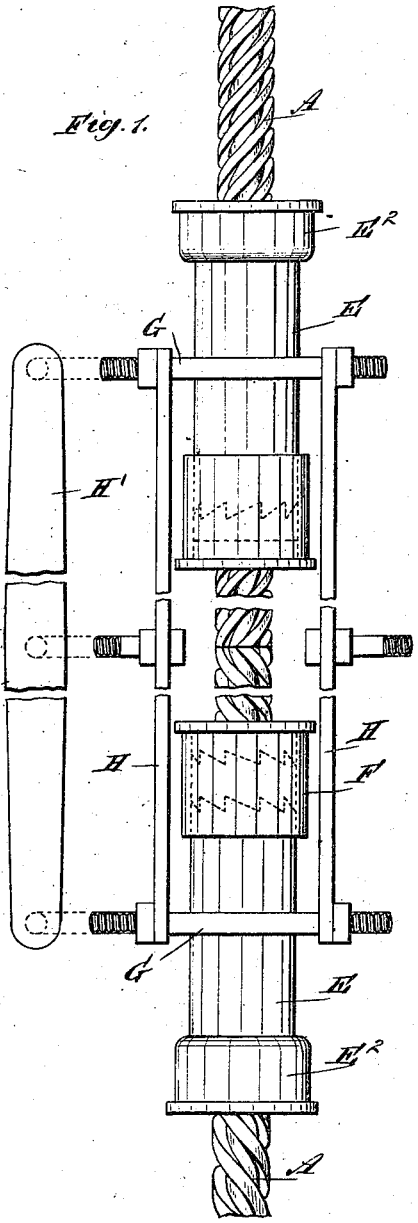
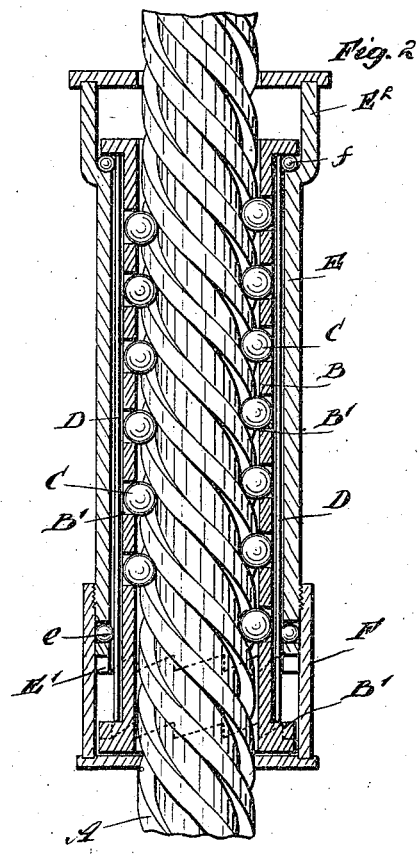
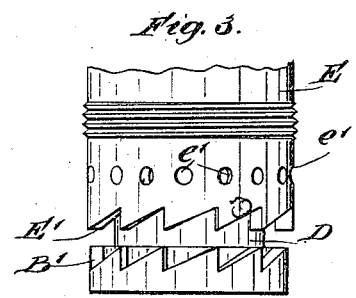
WITNESSES:
Otto Spieth.
H. L. Reynolds.
INVENTOR
S. L. Harwood
BY
ATTORNEYS.

UNITED STATES PATENT OFFICE.

SUMPTER LEA HARWOOD, OF UNIONTOWN, ALABAMA.

MECHANICAL MOVEMENT.

SPECIFICATION forming part of Letters Patent No. 594,741, dated November 30, 1897.

Application filed April 29, 1897. Serial No. 634,379. (No model.)

*To all whom it may concern:*

Be it known that I, SUMPTER LEA HARWOOD, of Uniontown, in the county of Perry and State of Alabama, have invented a new and Improved Mechanical Movement, of which the following is a full, clear, and exact description.

My invention relates to an improvement in mechanical movements intended for transforming reciprocating into rotary motion and the opposite; and it consists, essentially, of a shaft divided into two sections, each section being spirally grooved, but in opposite directions, and of a collar engaging each of these sections, and means for moving one relative to the other, and at the same time for preventing the rotation of the collars except in one direction.

Reference is to be had to the accompanying drawings, forming a part of this specification, in which similar characters of reference indicate corresponding parts in all the views.

Figure 1 is a plan view of my device. Fig. 2 is a section taken through one of the sleeves, showing the means by which motion is communicated to the shaft; and Fig. 3 is a detail view of one end of the same, showing the ratchet connection between two parts thereof.

My invention is intended for application to any mechanism where it is desired to transform reciprocating into rotary motion and possesses the advantage of having no dead-center and that the stroke of the reciprocating member may be varied without its affecting the rotation of the shaft.

The shaft A is formed with oppositely-running spiral threads at the ends thereof. These threads may meet in the center. Each section of the shaft is provided with a nut having means for engaging the threads of the shaft, and, as shown in the drawings, this nut consists of several parts. The inner portion is a sleeve B, which is provided with a series of apertures B', adapted to receive balls C of a size to fit the grooves formed by the threads on the shaft. Immediately outside the sleeve B is a ball-retainer D, consisting of a thin sleeve surrounding the sleeve B, so as to retain the balls in place. This ball-retainer may be omitted, if desired. Outside of this ball-retainer is the sleeve E, which is separated from the ball-retainer or the inner sleeve if the ball-retainer is omitted by balls $f$, which will form a bearing upon which the two may slide.

The sleeve E and the sleeve B have a limited reciprocation relative to each other. One end of the sleeve E is provided with ratchet-teeth E' and the opposing end of the sleeve B is provided with a collar having ratchet-teeth B', or provided with pins which act as a substitute for the ratchet-teeth. When the sleeve E is moved so that the two sets of ratchet-teeth engage each other, the sleeves B and E are locked together. Further reciprocation in that direction will, if the nut is prevented from rotating, engage the balls C with the grooves in the shaft A and rotate the shaft. When the return reciprocation is commenced, the outer sleeve E is first freed from the ratchet-teeth or pins upon the sleeve B. As the reciprocation is continued the balls will engage the shaft as before, but the inner sleeve B being free to rotate it will be rotated by the shaft. Each end of the shaft is provided with such a nut F, the relative positions of the nuts being, however, reversed, so that the outer sleeve of one nut is locked to its inner sleeve, while in the other nut the two are separated. This leaves one nut free to act as a driver at all times, while the other is free to turn upon the shaft. The two nuts are connected by means of a clamp G, which embraces the nut, and by bars H, which engage the clamp G, and by a handle H'. This compels the two nuts to reciprocate together. It is immaterial in which direction they are moved. The rotation of the shaft will be in the same direction in either case. It is also immaterial whether the length of the reciprocation is partial or complete. If desired, the shaft may have a spiral in one direction only, in which case the clutches will all be alike and act in one direction only. On the return stroke they will act as idlers. Balls $e$ serve as bearings for the nuts F on the ball-retainer D. (See Fig. 2.)

Having thus fully described my invention, I claim as new and desire to secure by Letters Patent—

1. A mechanical movement, comprising a shaft having sections spirally grooved in opposite directions, a sleeve surrounding each section, having apertures therein, and balls in said apertures, adapted to engage the spiral grooves and having also radially-projecting flanges having ratchet-teeth upon the side surface, an outer sleeve surrounding said first-named sleeve, having ratchet-teeth upon its end edges adapted to engage those upon the inner sleeve which permit free revolution in one direction and prevent revolution in the other direction, and a common connection between said outer sleeves, substantially as described.

2. A mechanical movement, comprising a shaft having sections spirally grooved in opposite directions, a sleeve surrounding each section, having holes therein, balls in said holes adapted to engage the spiral grooves, a ball-retaining sleeve immediately outside said sleeve, an outer sleeve surrounding the whole, the outer and inner sleeves being provided with ratchet-engaging means to permit free revolution in one direction and prevent revolution in the other direction, and a common connection between the outer sleeves, substantially as described.

SUMPTER LEA HARWOOD.

Witnesses:
B. F. HARWOOD, Jr.,
J. HARRY WHITE